United States Patent [19]
Williams et al.

[11] 3,887,433
[45] June 3, 1975

[54] PROCESS FOR PRODUCTION OF ANTIBIOTIC A-25822
[75] Inventors: Robert H. Williams; Marvin M. Hoehn; Karl-Heinz Michel, all of Indianapolis, Ind.
[73] Assignee: Eli Lilly and Company, Indianapolis, Ind.
[22] Filed: Mar. 21, 1974
[21] Appl. No.: 453,248

Related U.S. Application Data
[62] Division of Ser. No. 327,171, Feb. 2, 1973, Pat. No. 3,845,203.

[52] U.S. Cl................................... 195/81; 424/122
[51] Int. Cl............................................. C12d 7/00
[58] Field of Search ................. 195/81, 82; 424/122

[56] References Cited
UNITED STATES PATENTS
3,845,203  11/1974  Williams et al................... 195/81 X Primary Examiner—A. Louis Monacell
Assistant Examiner—R. B. Penland
Attorney, Agent, or Firm—William B. Scanlon; Everet F. Smith

[57] ABSTRACT

Antibiotic mixture A-25822, comprising microbiologically active, structurally related factors A, B, D, H, L, M and N, produced by culturing *Geotrichum flavobrunneum* NRRL 3862 under submerged aerobic fermentation conditions is isolated by extraction of the whole broth and the individual factors thereof are separated and isolated by chromatography and crystallization. The A-25822 mixture and individual factors thereof are particularly active against pathogenic fungi.

2 Claims, 7 Drawing Figures

INFRARED ABSORPTION SPECTRUM OF ANTIBIOTIC A 25822L

PROCESS FOR PRODUCTION OF ANTIBIOTIC A-25822

CROSS-REFERENCE

This is a division of application Ser. No. 327,171, filed 2-2-73, now U.S. Pat. No. 3,845,203 and a continuation-in-part of application Ser. No. 230,399 filed Feb. 29, 1972 now abandoned.

BACKGROUND OF THE INVENTION

Since the discovery of the penicillin antibiotics extensive microbiological and chemical research has produced an impressive array of antibiotic substances of great value in the treatment of diseases of man and animals. Even though this research has met with outstanding success, numerous infectious diseases remain a serious problem. For example, even though the most common infections of animal life such as those produced by Gram-positive microorganisms are amenable to successful control by the penicillins, the cephalosporins and other classes of antibiotics, certain other infectious diseases are not as easily controlled. Among such are the infections caused by the pathogenic fungi, for example, those caused by various species of Candida including C. tropicalis and C. albicans. Consequently, the search for more effective antibiotics continues, particularly for antibiotics which will be effective in the treatment of infections which are at present only modestly or poorly controlled, such as those of fungal origin.

SUMMARY OF THE INVENTION

This invention relates to antibiotic substances. In particular, it relates to a group of nitrogenous, polycarbocyclic antibiotic substances, which are produced by culturing a novel strain of the organism *Geotrichum flavobrunneum*.

The group of antibiotics of this invention are arbitrarily designated herein as the A-25822 antibiotics. The individual antibiotics of the group which have been separated and characterized, number seven, and are designated as A-25822 antibiotic factors A, B, D, H, L, M and N.

The A-25822 group of antibiotics is produced by culturing a novel strain of *Geotrichum flavo-brunneum* under submerged aerobic fermentation conditions until a substantial level of antibiotic activity is produced. The A-25822 antibiotics are recovered from the fermentation by extraction of the whole broth with an organic solvent, and following a basic wash of the extract, are extracted from the organic phase with aqueous mineral acid. The acidic extract is made basic and the major amount of the antibiotic activity is extracted therefrom with a hydrocarbon solvent with a lesser amount of antibiotic activity being extracted thereafter with a polar organic solvent. The organic extracts are combined and evaporated to provide the crude mixture of A-25822 antibiotics.

The individual A-25822 antibiotics have been separated from each other and isolated as individual antibiotic compounds by column chromatography, thin layer chromatography, gas-liquid chromatography and crystallization procedures.

THE A-25822 antibiotics inhibit the growth of organisms which are pathogenic to animal and plant life and are particularly valuable antibiotics because of their antifungal activity displayed both in vitro and in vivo against the fungi, for example, Candida sp. and Cryptococcus sp.

DESCRIPTION OF THE DRAWINGS

The infrared absorption spectrum for each of the A-25822 antibiotic factors is presented in the drawings as follows.

DETAILED DESCRIPTION OF THE INVENTION

The A-25822 antibiotics of this invention are structurally related to each other and exhibit chemical, physical and spectral characteristics somewhat similar to those of the azasteroids. Each factor of the group contains one basic nitrogen atom per molecule.

The antibiotic factors co-produced during the fermentation are obtained as a mixture and are separated from each other and isolated as individual compounds as hereinafter described. The mixture of A-25822 factors is a yellowish oil which is soluble in most common organic solvents but is substantially insoluble in water. The mixture of factors, as well as the isolated individual factors, are stable for several months in weakly acidic aqueous solutions.

The following paragraphs contain a description of the physical and spectral properties of the various A-25822 factors which have been characterized.

Factor A is a white crystalline compound melting at about 147°C. (colorless plates from acetonitrile). The molecular weight of factor A as determined by mass spectrometry is 439. The empirical formula as calculated is $C_{30}H_{49}NO$. Elemental analysis of factor A gave the following percentage composition: carbon, 82.17 percent; hydrogen, 11.31 percent; nitrogen, 3.38 percent. The specific rotation of factor A as determined in methanol is $$[\alpha]_D^{25} - 70° (C = 1.15, MeOH).$$

Electrometric titration shows the presence of one titratable group having a pKa value of 8.45 as determined in 66 percent dimethylformamide (DMF).

Figure 1:
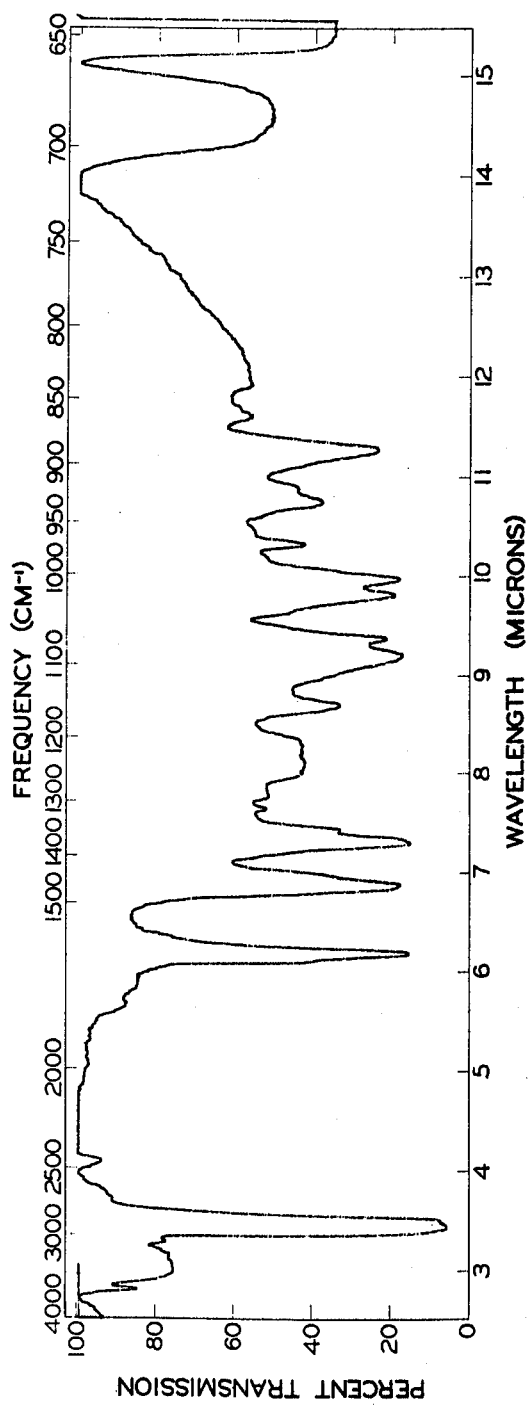
FIG. 1 — Factor A.

The following absorption maxima, in microns, are observed in the infrared spectrum of factor A as determined in chloroform and as shown in FIG. 1 of the drawings: 2.79, 3.0, 3.26, 3.42, 3.48, 6.10, 6.17, 6.87, 6.95, 7.29, 7.42, 7.62, 7.75, 8.68, 9.19, 9.37, 9.80, 9.96, 10.31, 10.73 and 10.87 microns.

Factor A absorbs in the U. V. region of the spectrum and exhibits absorption maxima in both neutral and basic ethanol solutions at λ max. 239 mμ which shifts to λ max. 279 mμ in acid.

Antibiotic A-25822 factor B is a white crystalline compound melting at about 115°–118°C. (needles from acetone/-hexane). The hydrochloride salt of factor B, obtained by saturating an ether solution of the antibiotic with anhydrous hydrogen chloride and collecting the precipitate of the hydrochloride salt, melts over the range of 128°–141°C.

Factor B has an empirical formula of $C_{28}H_{45}No$ and a molecular weight as determined by mass spectrometry of 411. Electrometric titration shows the presence of one titratable group having a pKa value of 8.5 as determined in 66 percent aqueous DMF.

The approximate percent elemental composition of factor B as determined by elemental analysis is: carbon, 81.47 percent; hydrogen, 10.91 percent nitrogen, 3.21 percent.

The observed specific rotation of factor B is $$[\alpha]_D^{25} - 16.7° \text{ (C} = 0.775, \text{ MeOH)}.$$

Figure 2:
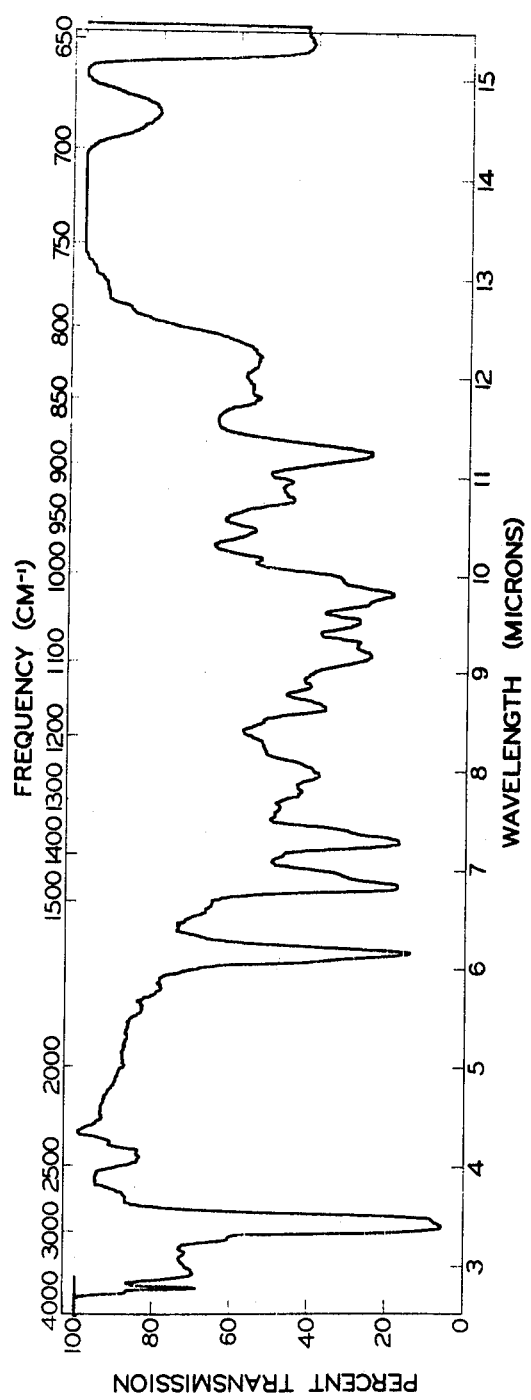
FIG. 2 — Factor B.

As shown in FIG. 2 of the drawings the following distinguishable absorption maxima are observed in the infrared absorption spectrum of factor B in chloroform solution: 2.78, 2.92, 3.12, 3.27, 3.40, 3.48, 6.1 (strong), 6.15, 6.73, 6.93, 7.1, 7.27, 7.96, 8.63, 8.86, 9.17, 9.30, 9.53, 9.72, 9.81, 9.95, 10.15, 10.44, 10.76, 10.94, 11.23 and 11.78 microns.

Factor B, like factor A shows absorption in the U. V. region at λ max. 239 m$\mu$ (neutral) with a shift in the absorption maximum to λ max. 279 m$\mu$ in acid.

Factor D of the A-25822 antibiotic group is a white amorphous compound melting at about 51°–55° C. and having a molecular weight of 427 as determined by mass spectrometry. The empirical formula is $C_{28}H_{45}NO_2$.

Electrometric titration shows the presence of one titratable group having a pKa value of 7.7.

Elemental analysis of factor D gives the following percent elemental composition: carbon, 78.40 percent; hydrogen 10.28 percent nitrogen, 3.17 percent.

The observed specific rotation of factor D is:

$$[\alpha]_D^{25} + 39° \text{ (C} = 0.725, \text{ MeOH)}.$$

Figure 3:
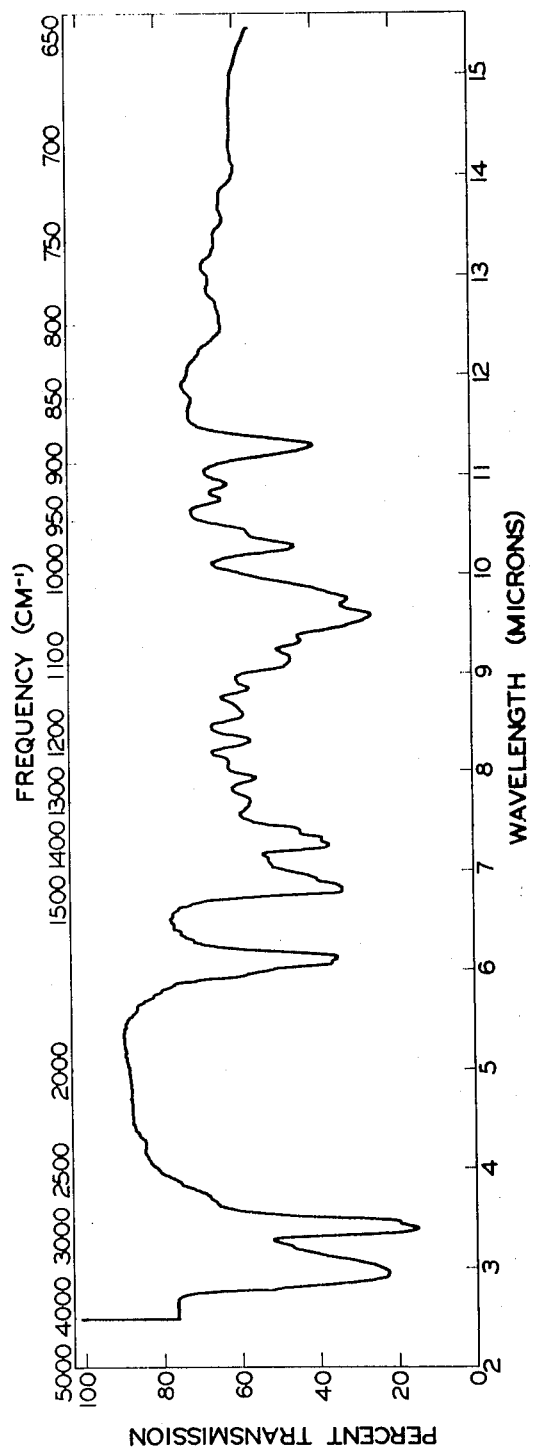
FIG. 3 — Factor D.

The infrared absorption spectrum of factor D as shown in FIG. 3 of the drawings shows the following absorption maxima: 2.97, 3.43, 3.50, 3.7 (broad), 5.97, 6.04, 6.09, 6.15, 6.82, 6.93, 7.28, 7.34, 7.42, 7.7, 7.94, 8.1, 8.34, 8.6, 8.87, 9.10, 9.18, 9.35, 9.61, 9.77, 10.29, 10.4, 10.76, 10.92 and 11.32 microns.

The ultraviolet absorption spectrum of factor D in ethanol shows an absorption maximum at λ max. 235 m$\mu$ (neutral) which shifts to λ max. 270 m$\mu$ in acid.

Antibiotic factor H, as isolated, is a white amorphous compound having a molecular weight of 425 as determined by mass spectrometry and melting at about 74°–77° C. The empirical formula for factor H is $C_{28}H_{43}NO_2$.

Electrometric titration of factor H in 66 percent DMF shows the presence of one titratable group with a pKa value of 6.9.

The observed specific rotation of factor H is:

$$[\alpha]_D^{25} + 15° \text{ (C} = 0.147, \text{ MeOH)}$$

Figure 4:
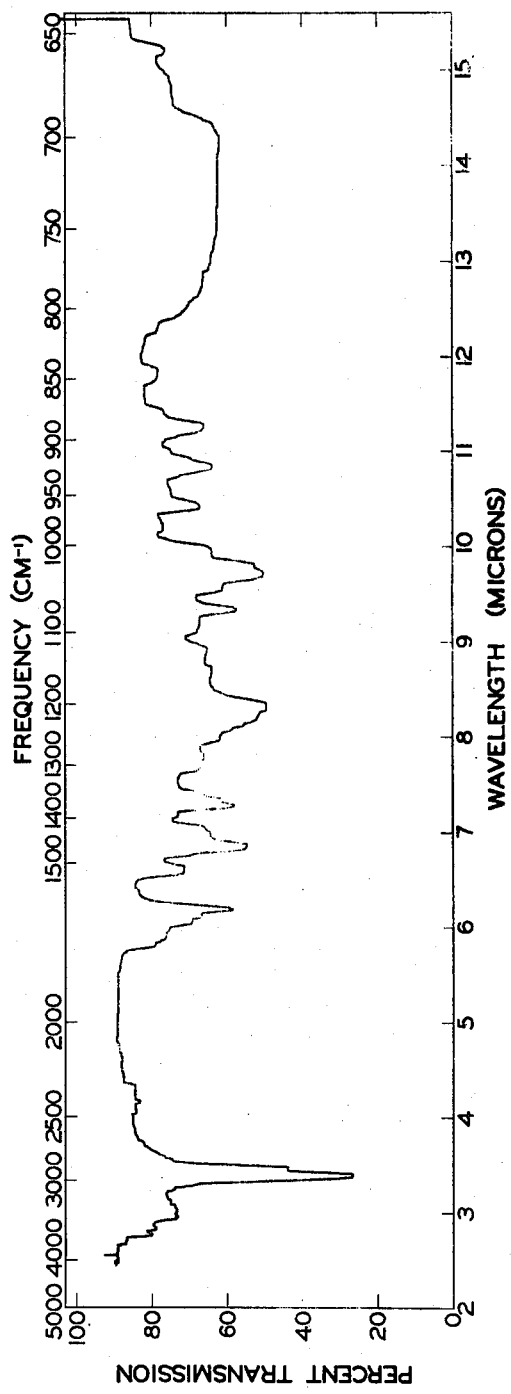
FIG. 4 — Factor H.

As shown in FIG. 4 of the drawings, the following distinguishable absorption maxima are observable in the infrared spectrum of factor H: 3.40, 3.50, 6.20, 6.60, 6.90, 7.30, 8.35, 9.35, 9.70, 10.40, 10.85 and 11.25 microns.

The U. V. absorption spectrum of factor H shows an absorption maximum at λ max. 235 m$\mu$ at neutral and basic pH which shifts to λ max. 270 m$\mu$ in acid.

A-25822 factor L is a yellowish amorphous compound having a molecular weight of 425 as determined by mass spectrometry. The approximate empirical formula calculates as $C_{28}H_{43}NO_2$.

Elemental analysis of factor L gives the following approximate elemental composition: carbon, 78.66 percent; hydrogen, 9.74 percent; nitrogen, 3.06 percent.

Electrometric titration of factor L in 66 percent DMF shows one titratable group with a pKa value of 4.75.

Figure 5:
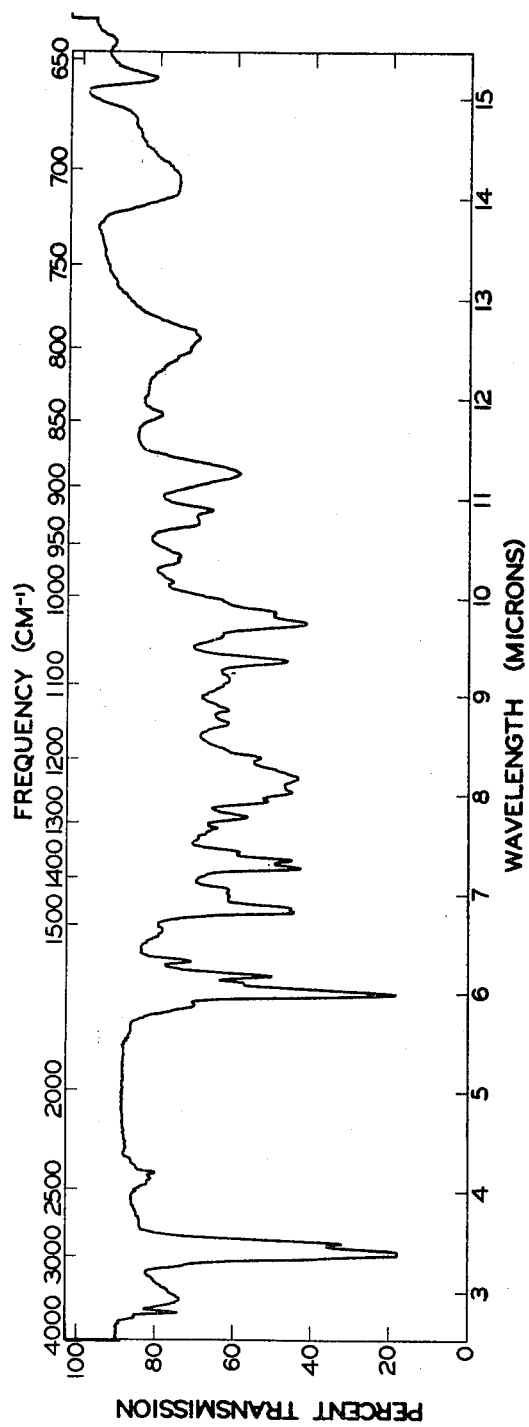
FIG. 5 — Factor L.

The infrared absorption spectrum of factor L, in chloroform, as shown in FIG. 5 of the drawings shows the following distinguishable absorption maxima: 2.80, 2.93, 3.40, 3.50, 6.0, 6.10, 6.19, 6.32, 6.84, 6.89, 7.29, 7.36, 7.44, 7.66, 7.79, 7.95, 8.04, 8.18, 8.40, 8.74, 8.88, 9.18, 9.37, 10.41, 10.75, 10.90, 11.28 and 11.85 microns.

The U. V. absorption spectrum of factor L has the following absorption maximum λ max. 262 m$\mu$ in neutral and basic solution which shifts to λ max. 279 m$\mu$ in acid.

The observed specific rotation of factor L is:

$$[\alpha]_D^{25} + 75° \text{ (C} = 0.072, \text{ MeOH)}.$$

Antibiotic A-25822 factor M is a yellowish, semicrystalline compound melting at about 140°C. Its molecular weight as determined by mass spectrometry is 453. The calculated empirical formula is $C_{30}H_{47}NO_2$.

Elemental analysis of factor M gives the following approximate elemental composition: carbon, 78.04 percent; hydrogen, 10.83 percent; nitrogen 3.07 percent.

The observed specific rotation of factor M is:

$$[\alpha]_D^{25} - 15° \text{ (C} = 0.021, \text{ MeOH)}.$$

Electrometric titration of factor M in 66 percent DMF shows one titratable group with a pKa value of 7.9.

Figure 6:
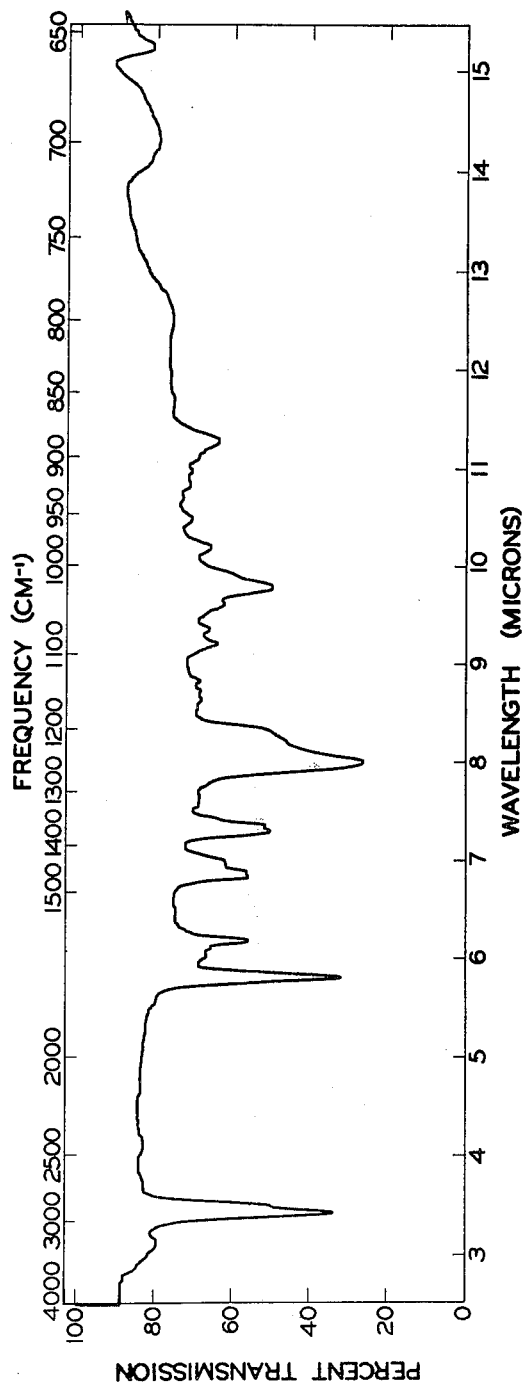
FIG. 6 — Factor M.

The infrared absorption spectrum of factor M in chloroform as shown in FIG. 6 of the drawings has the following distinguishable absorption maxima: 3.45, 3.52, 5.82, 6.20, 6.84, 6.90, 7.0, 7.30, 7.38, 8.03, 8.2–8.35, 9.21, 9.36, 9.60, 9.77, 9.80, 10.20, 10.60 and 11.28 microns.

Factor M absorbs in the U. V. with its absorption spectrum showing a maximum of λ max. 239 m$\mu$ in neutral and basic solution which shifts to λ max. 279 m$\mu$ in acid.

Antibiotic factor N of the A-25822 group of antibiotics is a white crystalline compound melting at about 165°C. and which has a molecular weight of 409 as determined by mass spectrometry. The calculated empirical formula for factor N is $C_{28}H_{43}NO$.

Elemental analysis of factor N gives the following approximate elemental composition: carbon, 82.09 percent; hydrogen, 10.58 percent; nitrogen, 3.42 percent.

The observed specific rotation for factor N is $$[\alpha]_D^{25} - 14° \text{ (C} = 0.05, \text{ MeOH)}.$$

Electrometric titration of factor N in 66 percent DMF shows the presence of one titratable group having a pKa value of 7.45.

Figure 7:
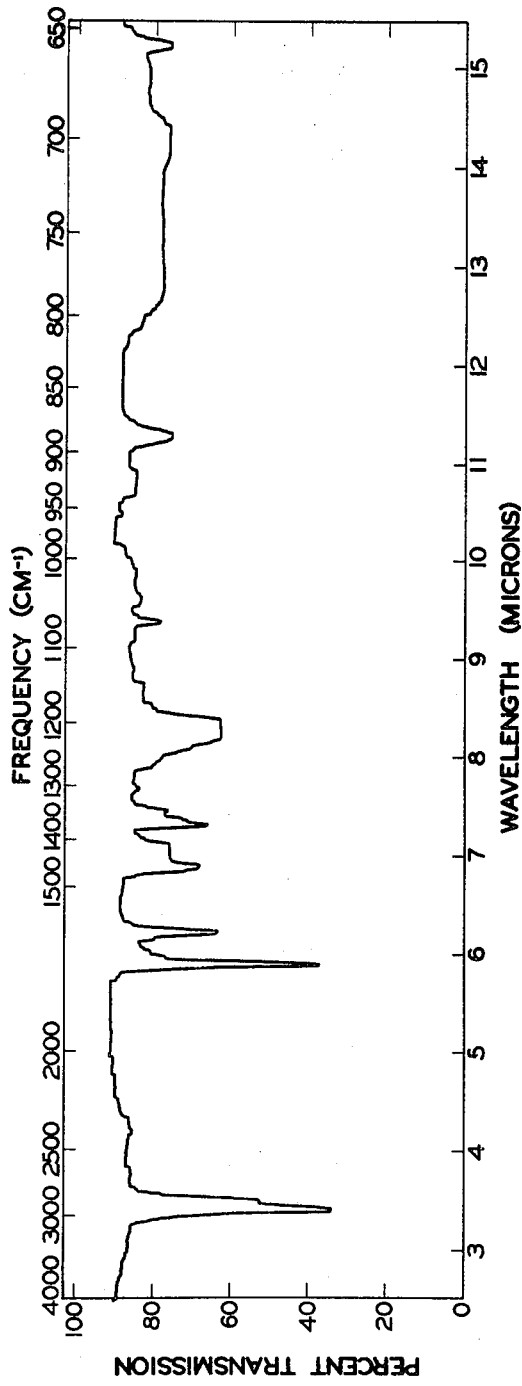
FIG. 7 — Factor N.

As shown in FIG. 7 of the drawings, the following distinguishable maxima are observable in the infrared spectrum of factor N in chloroform: 3.40, 3.50, 5.88, 6.20, 6.85, 7.28, 8.15–8.38, 9.35 and 11.25 microns.

The U. V. spectrum of factor N shows a maximum at λ max. 240 m$\mu$ at neutral and basic pH which shifts to 280 m$\mu$ in acid.

The structures of factors A, the acetate derivative of A, B and M (the acetate derivative of B) have been determined and are represented by the following formula.

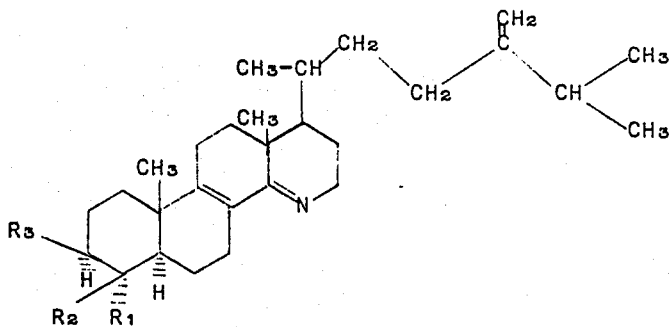

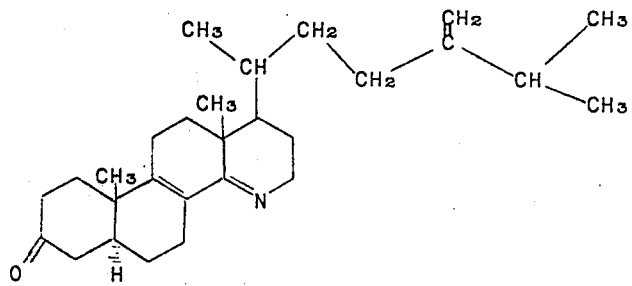

wherein $R_1$ and $R_2$ are both hydrogen or both methyl, and $R_3$ is hydroxy or acetoxy.

Factor B is represented when $R_1$ and $R_2$ are both hydrogen and $R_3$ is hydroxy. Factor M, the acetate derivative of B which is produced in the fermentation along with factor B is represented structurally when $R_1$ and $R_2$ are both hydrogen and $R_3$ is acetoxy. When in the above formula $R_1$ and $R_2$ are both methyl and $R_3$ is hydroxy the structural formula of factor A is represented. The acetate derivative of A ($R_1 = R_2 =$ methyl, $R_3 =$ acetoxy) is prepared with A synthetically by reacting A with acetic anhydride in pyridine. Factor M can also be prepared synthetically by reacting factor B with acetic anhydride in pyridine.

In the above formula the dashed bonding lines between atoms indicates the α-configuration while the solid bonding lines for the two angular methyl groups and the hydroxyl or acetoxy groups indicate the β-configuration.

The A-25822 factors represented above are formally named herein according to the accepted steroid nomenclature system by following the numbering system shown below.

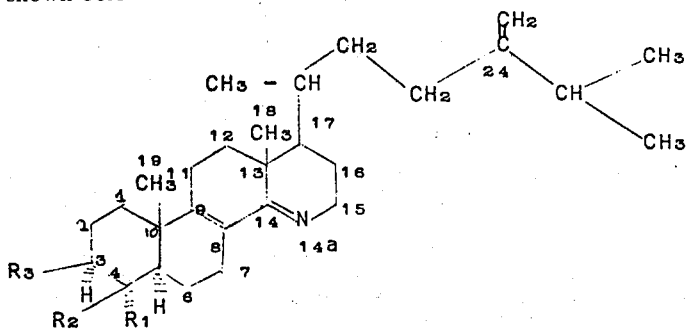

Accordingly A-25822 factor A is 3β-hydroxy-24-methylene-14a-aza-D-homo-4,4-dimethyl-5-α-cholest-8(9),14(14a)-diene. The acetate derivative of A is 3β-acetoxy-24-methylene-14a-aza-D-homo-4,4-dimethyl-5-α-cholest-8(9),14(14a)-diene.

A-25822 factor B and its acetate, factor M, are named respectively 3β-hydroxy-24-methylene-14a-aza-D-homo-5α-cholest-8(9),14(14a)-diene and 3β-acetoxy-24-methylene-14a-aza-D-homo-5α-cholest-8(9),14(14a)-diene.

The structure of A-25822 factor N has also been determined and is represented by the following formula Factor N is formally named as 24-methylene-14a-aza-D-homo-5α-cholest-8(9),14(14a)dien-3-one.

The structures of A-25822 factors A, B, M and N were determined by a study of their physical, chemical and spectral properties including their nuclear magnetic resonance spectra and infrared spectra. The structures have been confirmed by X-ray crystallography.

The structures of the remaining A-25822 factors, (D, L and H) have not as yet been determined, however, tentative assignments for factors D and L have been made. Factor D, having two hydroxy groups, appears to be a 15-hydroxy substituted factor B, namely, a 3,15-dihydroxy-24-methylene-14a-aza-D-homo-5α-cholest-8(9),14(14α)-diene. Factor L appears to be the 15-keto derivative of factor B, namely, 3β-hydroxy-24-methylene-14a-aza-D-homo-5α-cholest-8(9),14(14a)-diene-15-one. No structural assignments for factor H have as yet been made.

The A-25822 antibiotics can be used as antibiotics in the free base form or in the form of non-toxic, pharmaceutically acceptable acid addition salts. The antibiotics as the free bases readily form acid addition salts with mineral acids such as hydrochloric acid, hydrobromic acid, sulfuric acid and phosphoric acid, and with organic acids such as the carboxylic acids, acetic, propionic, citric, maleic, benzoic, tartaric, oxalic, succinic, ascorbic, malic and the like, and the organic sulfonic acids such as benzenesulfonic acid, p-toluenesulfonic acid, methanesulfonic acid, laurylsulfonic acid and the like.

The A-25822 factors react with methyl iodide to form the crystalline methiodide salts.

The A-25822 factors and mixtures thereof in the free base form are substantially insoluble in water but are soluble in the common polar organic solvents such as dimethylformamide, dimethylsulfoxide, acetone, ethyl acetate, iso-amyl acetate, methanol, ethanol, chloroform and the like. They are less soluble in the less polar organic solvents such as benzene and carbon tetrachloride and are the least soluble in the alkyl hydrocarbon solvents such as pentane, hexane and heptane.

The salts of the A-25822 factors and mixtures thereof are substantially soluble in water. For example, the hydrochloride salt and the sulfate salt of factor B are readily soluble in water.

Factor B as the free base is a polymorphic substance. When crystallized from different solvents, it displays different melting points and X-ray diffraction patterns. For example, when the free base is crystallized from n-hexane, it melts at 56°–58° C. When crystallized from pentane the free base melts at 42°–44°C., while from a acetone-hexane mixture it melts at 115°–118°C. Each crystalline form has the same elemental analysis, titration value and spectral characteristics and differ from each other only in melting point and X-ray pattern. Because of the optical activity displayed by the A-25822 factors, it appears that the polymorphism displayed by factor B may be related to diastereoisomerism.

The occurrence of polymorphic forms of factor B is similar to the behavior of some polymorphic azasteroids.

The factors A, B, and L react with acetic anhydride to form mono acetyl derivatives while factor D forms a diacetyl derivative.

The mixture of A-25822 antibiotics and the individual factors thereof inhibit the growth of microorganisms which are pathogenic to animal and plant life. The mixture and the individual factors are especially active against pathogenic fungi both in vitro and in vivo and can be employed in the treatment and control of diseases having a fungal origin in both animals and humans.

The acetyl derivative of factor A, (above formula, $R_1 = R_2 =$ methyl, $R_3 =$ acetoxy) which is prepared with A and acetic anhydride in pyridine is somewhat less active than is factor A. Similarly the acetyl derivative of B (factor M) is somewhat less active than factor B. Both acetyl derivatives can be employed in inhibiting the growth of fungi in the same manner as the parent hydroxy antibiotics are used.

In Table I, which follows, the minimum inhibitory concentration (M.I.C.) as determined by the standard discplate assay of the A-25822 mixture of antibiotic factors is listed for several illustrative microorganisms.

Table I

*In Vitro* Antimicrobial Activity
Antibiotic A-25822 Mixture

| Organism | Minimum Inhibitory concentration mcg./ml. |
|---|---|
| *Staphylococcus aureus* 3055 | 25 |
| *Streptococcus faecalis* | 50 |
| *Klebsiella aerobacter* KA 17 | 50 |
| *Pasteurella multocida* | 10 |
| *Erwinia amylovora* | 6.25 |
| *Xanthomonas phaseoli* | 50 |
| *Candida tropicalis* A 17 | .78 |
| *Trichophyton mentagrophytes* | .78 |
| *Botrytis cinerea* | 3.12 |
| *Fusarium oxysporum* | 25 |
| *Verticillium albo-atrum* | 1.56 |

The in vitro susceptibility of selected pathogenic fungi to the A-25822 mixture of antibiotic factors and the individual factors A, B, and D has been determined by a broth dilution assay using Sabourauds broth. The assay was carried out in the following manner. Siliconized glass tubes containing two-fold dilutions of antibiotic in Sabourauds medium were inoculated with a suspension prepared from homogenized fungal growth. The inoculated tubes were incubated on a rotary shaker rotated at 250 rpm. All determinations were made when tubes without antibiotic (control tubes) exhibited abundant growth. The minimum inhibitory concentration (MIC) was recorded as the lowest concentration of antibiotic which prevented visible growth. Tubes of antibiotic free-broth were then inoculated from tubes in the MIC series which did not exhibit visible growth in order to determine the minimum lethal concentration (MLC).

In Table II, which follows, the minimum inhibitory concentration and the minimum lethal concentration of the A-25822 mixture and factors A, B, and D, against representative pathogenic fungi are shown.

Table II

*In Vitro* Antifungal Activity of the A-25822 Antibiotics
Broth Dilution Assay

| A-25822 Antibiotic | *Candida albicans* A-25 | *Candida albicans* | *Cryptococcus neoformans* | *Trichophyton mentagrophytes* | *Trichophyton rubrum* | *Mycosporum gypseum* |
|---|---|---|---|---|---|---|
| | | Minimum Inhibitory Concentration/Minimum Lethal Concentration (mcg./ml.) | | | | |
| A-25822 mixture | 1.25/2.5 | 2.5/5.0 | 0.078/0.625 | 0.0156/0.0625 | 0.0156/0.0625 | 0.0625/0.5 |
| Factor A | 1.25/40 | 2.5/40 | 0.156/1.25 | 0.0019/1.0 | 0.0019/0.5 | 0.0156/÷1.0 |
| Factor B | 0.625/20 | 2.5/÷40 | 0.156/1.25 | 0.0039/1.0 | 0.0156/1.0 | 0.0156/1.0 |
| Factor D | 10/40 | 10/÷40 | 1.25/5 | 0.5/÷1.0 | 0.5/÷1.0 | 1.0/÷1.0 |

In Table III, which follows, the in vitro antifungal activity of the A-25822 factors H, L, M and N is shown. As indicated in the Table, both the standard disc plate assay and the agar dilution assay were employed with the indicated organisms. The values shown are the minimum inhibitory concentrations for the respective antibiotics in micrograms per milliliter.

Table III

In Vitro Antifungal Activity of A-25822 Antibiotics
Minimum Inhibitory Concentration (MIC) μg./ml.

| A-25822 Factor | Candida[1] albicans | Trichophyton[1] mentagrophytes | Cryptococcus[2] neoformans | Blastomyces[2] dermatitidis | Histoplasm[2] capsulatum |
|---|---|---|---|---|---|
| H | 0.625 | 0.156 | 10 | 0.625 | 0.625 |
| L | 0.625 | 0.156 | 2.5 | 0.625 | 0.625 |
| M | 1.0 | 0.25 | >10 | 5.0 | 2.5 |
| N[3] | 2.5 | 0.312 | 5.0 | 0.625 | 0.625 |

[1]Disc Plate Assay
[2]Agar Dilution Assay
[3]Factor N sulfate salt

The in vivo activity of the A-25822 complex of antibiotics and the individual factors thereof has been demonstrated by tests carried out with mice infected with C. albicans.

In Table IV which follows the in vivo activity of the A-25822 antibiotic mixture of factors, factor A, factor B and factor D is illustrative of the in vivo activity displayed by the A-25822 antibiotics. The data listed in Table IV were obtained in tests with mice carried out in the following manner.

Groups of mice were preirradiated with 400 r (Roentgen) and thereafter infected by the intravenous administration of Candida albicans A26(1 × $10^6$ cells/mouse). The irradiated mice were than treated subcutaneously at 0 and 2 hours post infection with the respective antibiotic factors. The extension of survival times of the treated mice beyond the survival time of untreated control mice demonstrates the antifungal activity.

In Table IV, the dose was administered subcutaneously (sc.) and is reported as mg./kg. of body weight. The survival time is rated as the percentage survival time over untreated controls. In the column at the right, the $LD_{50}$ (lethal dose of 50 percent of the test group) is reported at 7 days and only for the 50 mg./kg. dose.

Table IV

In Vivo Antifungal Activity A-25822 Antibiotics

| Antibiotic Factor | Dose mg./kg. sc. | Percent Survival over controls | $LD_{50}$ mg./kg. (7 days) |
|---|---|---|---|
| A-25822 mixture | 50 | 32 | 19.95 |
|  | 25 | 105 |  |
|  | 12.5 | 71 |  |
|  | 6.25 | 63 |  |
| Factor A | 50 | 46 | 10 |
|  | 25 | 75 |  |
|  | 12.5 | 58 |  |
| Factor B | 50 | 16 | 10 |
|  | 25 | 106 |  |
|  | 12.5 | 16 |  |
|  | 6.25 | 23 |  |
| Factor D | 50 | 64 | 10 |
|  | 25 | 9 |  |

The A-25822 factors can be used as antifungal agents either in the free base form or as non-toxic, pharmaceutically acceptable salts formed with suitable acids such as hydrochloric acid or sulfuric acid. Such salts have the advantage of substantial water solubility which characteristic renders the antibiotics in the salt form more amenable to formulation. For example, aqueous spray solutions of the antibiotics can be formulated after wetting agents for application to environmental surfaces inhabited by unwanted fungi. Likewise, isotonic solutions of the antibiotic salts can be prepared for intraperitoneal administration to a fungus infected host.

In certain instances, the purified mixture of the A-25822 antibiotics can be employed without the necessity of separating and using the individual factors. For example, in fighting fungal growth on environmental surfaces such as shower stalls, exterior wooden surfaces, paper and plastic surfaces and the like, the mixture of the antibiotics as the free bases or as the water soluble salts thereof is suitable. When used in combating infections in an infected host however, it is desirable to employ a single factor, for example, factor B, for administration.

The A-25822 antibiotics are also useful in combating infections attributable to the dermatophytes. For example, the affected skin area can be treated with the antibiotics by applying an aqueous solution containing an A-25822 factor at a concentration greater than the minimum inhibitory concentration for the particular organism. Such antifungal solutions can be applied as a spray or wash, or by swabbing the affected skin area. Such aqueous solutions of the A-25822 antibiotics are also useful in preventing the spread of fungal infections as for example by employing the solutions in swimming pool foot baths, shower stalls and like public facilities.

The organism which produces the A-25822 antibiotics was isolated by the standard serial dilution procedure from a soil sample collected in the Grand Teton National Park region of Wyoming. The organism has been taxonomically characterized as a new strain of Geotrichum flavo-brunneum Miller et al. as described in the following paragraphs.

In general, the novel strain of the A-25822 producing organism is a member of the imperfect fungi which forms septate mycelia. The conidia, formed by segmentation of the mycelia, are thick-walled, short, cylindrical, hyaline, and have truncate ends.

CULTURAL CHARACTERISTICS

Potato-Dextrose agar—Colonies measuring 7.8 cm. in diameter after 18 days incubation at room temperature; surface uniformly pale chocolate brown (E6 plate 13 in Maerz and Paul *A Dictionary of Color*, 1950, McGraw-Hill, N.Y.). The colony exhibited low growing, matted, with funiculose trailing hyphae. Reverse:bright caramel-gold with pigment diffusing throughout the agar.

Cornmeal Agar—Thin colonies, mostly submerged, uncolored to pale yellow to pale brown.

MORPHOLOGICAL CHARACTERISTICS

Vegetative hyphae are uncolored or lightly pigmented with prominent septa. Two kinds of reproductive cells are formed on the media listied above: 1) arthrosphores: measuring 4.0–9.0 × 2.2 to 4.0 microns, which are truncate, smooth, and lightly pigmented, arising through fragmentation of upright aerial hyphae or prostrate hyphae or both, then remaining adherent in chains, unbranched or rarely with one or two side branches, which are commonly 90–100 microns in length and 2) intercalary chlamydospores: thick-walled, smooth, uncolored or yellowish, subglobose to oval in shape and measuring 9 × 7 microns to 21 × 11 microns with an average size of 14–16 × 9–11 microns.

Based on the foregoing taxonomic description of the A-25822 producing strain, the organism has been classified as a novel strain of *Geotrichum flavo-brunneum* Miller et. al. [Miller, J. H. et al *MYCOLOGIA*-49, 779–808,(1957)].

The culture herein described characteristically produces many intercalary chlamydospores, not mentioned in the *G. flavo-brunneum* taxonomic description in the cited reference, but in all other respects is in agreement with the published description of that species.

A culture of the A-25822 producing organism has been deposited with the permanent culture collection of the Agricultural Research Service, Northern Utilization Research and Development Division, Department of Agriculture, Peoria, Illinois, where it has been deposited without restriction as to availability and has been accorded the accession number, NRRL 3862.

The culture medium employed to produce the antibiotic mixture can be any one of a number of media since the A-25822 producing organism is capable of utilizing energy from a variety of nutrient sources. Thus, for example, a variety of carbohydrates can be included in the culture medium to supply the carbon requirements for the organism. Likewise, various sources of nitrogen, such as the amino acids, distiller's extracts and like nitrogen sources can be employed in the A-25822 medium. For reasons of economy in production, optimal yield, and ease of isolation of the antibiotic, certain culture media are preferred. For example, one of the preferred sources of carbohydrate in the fermentation is molasses, although glucose or sucrose can also be used. Preferred sources of nitrogen are peptones, soybean meal, amino acid mixtures and the like. As is common in the production of antibiotics in general, nutrient inorganic salts can be incorporated in the culture medium for the production of A-25822 antibiotics. Such inorganic nutrients are the customary salts capable of yielding sodium, potassium, ammonium, calcium, phosphate, chloride, carbonate, and like ions.

Essential elements necessary for the growth and development of the A-25822 producing organism should also be included in the culture medium. Such essential elements are usually required in only trace amounts. Such trace elements commonly occur as impurities in the other constituents of the medium in amounts sufficient to meet the requirements of growth for the A-25822 producing organism.

The strain of the organism employed to produce the A-25822 antibiotics, is capable of growing under a variety of conditions. For example the organism will grow in a variety of media in which the initial pH varies rather extensively. However, it has been found desirable to initiate the fermentation in a medium at a pH between about 6 and about 8 and preferably between about 6 and 7. Commonly, during the growth of the organism, the pH of the medium will increase gradually from the initial levels to a pH of about 7.5 or higher. The final pH of the culture medium is dependent at least in part on such factors as the initial pH of the medium, the buffers present therein, and the length of time the organism is allowed to grow.

The A-25822 producing organism of the present invention is capable of growing and producing antibiotic activity on various types of media. For example, the organism can be grown on agar slants, in shake flasks, or in medium or large scale fermentation tanks. For large scale production of the antibiotics of the invention submerged aerobic fermentation conditions are preferable. For the preparation of relatively small quantities of the A-25822 antibiotics shake flask or surface culture in bottles can be employed.

In carrying out the submerged aerobic fermentation for the production of the A-25822 antibiotics, the organism is at first grown on agar slant cultures and the spores of the fungus are transferred from the slant to vegetative inoculum. The vegetative inoculum thus inoculated with the spores from the agar slant insures a rapid growth of the organism on a small scale. The inoculated vegetative medium is allowed to grow until a viable culture of the growing organism is obtained and is then used to inoculate the larger scale tank. The use of the vegetative inoculum as an intermediate stage in the production of the antibiotic is preferable to the direct inoculation of a large scale fermentation tank with spores obtained from an agar slant. Fermentation media in large scale tanks thus inoculated by means of a vegetative medium provide more rapid growth of the organism than that obtained by the direct inoculation with spores from an agar slant. Such rapid growth obtained with a vegetative inoculum is highly desirable from the production standpoint in that fermentor time and overall production time is reduced.

The strain of the organism producing the A-25822 antibiotics grows best at temperatures between about 25 and 35°C. Optimal production of the antibiotic appears to occur at temperatures between about 25° and about 28°C.

As in other aerobic, submerged culture processes, sterile air is blown through the culture medium during the fermentation period. For efficient growth of the organism and consequent efficient production of the antibiotic, the volume of air employed is preferably in excess of about one tenth volume of air per minute per volume of culture medium. In the submerged aerobic fermentation of the A-25822 antibiotics, optimal yields are obtained when the volume of air employed is at least 0.3 volumes of air per minute per volume of culture medium.

In general, maximum production of the A-25822 antibiotics occurs between about 3 and about 6 days after the inoculation of the culture medium when submerged aerobic fermentation conditions or shake flask culture conditions are employed. The maximum production of the antibiotics in large scale fermentation tanks under submerged aerobic conditions is about 72 hours. When surface culture is employed, production of the antibiotic occurs over a longer period of time.

The course of the fermentation can be followed by assaying the fermentation medium from time to time against an organism susceptable to the A-25822 antibiotics. Two such organisms which can be employed are *Candida tropicalis* and *Trichophyton mentagrophytes*.

Following the production of the antibiotic under submerged aerobic fermentation conditions, the A-25822 antibiotic mixture previously described can be recovered from the fermentation broth by methods commonly employed in the fermentation art. The majority of the antibiotic activity produced is found associated with the mycelium. Relatively small amounts of the antibiotic activity are found in the filtered broth. For example, in a common 250 gallon fermentation run approximately 90 percent of the antibiotic activity produced was found associated with the mycelium while approximately 10 percent was found in th filtered fermentation broth.

Under the conditions employed thus far, the strain of the organism described previously and designated as NRRL 3862 produces antibiotic factor B as the predominant antibiotic factor. In general, factor B accounts for between about 80 and 90 percent of the total recovered antibiotic activity. The remaining factors account for substantially all of the remainder of the antibiotic activity.

The A-25822 antibiotics are recovered from the fermentation medium as an antibiotic mixture. Since the majority of the antibiotic activity is associated with the mycelium the fermentation medium is filtered and the mycelium is extracted with a suitable organic solvent.

Solvents such as the lower alcohols, methanol, ethanol and isopropanol, the esters such as ethyl acetate, amyl acetate and iso-amyl acetate are suitable solvents useful for extracting the mycelium. Ethyl acetate is a desirable extractant.

The extract is then dried and evaporated to dryness to afford the crude antibiotic mixture. Alternatively, the whole fermentation broth can be extracted with a suitable organic, water immiscible solvent such as ethyl acetate and thereafter filtered and the extract treated as in the first instance to obtain the crude antibiotic mixture. The crude mixture of A-25822 antibiotics can be purified either by an acid-base wash of an organic solution of the mixture or alternatively by chromatography over a suitable adsorbent such as alumina or silica gel. The preferred recovery procedure of this invention is by the extraction of the whole fermentation medium. Accordingly, the whole fermentation broth is extracted with a suitable organic solvent such as ethyl acetate or amyl acetate and the extract is washed to remove impurities. Optionally, the extract can be washed with aqueous acid to wash out the basic antibiotics in the form of the acid addition salts. Thereafter, the aqueous acidic wash can be basified with a base such as sodium hydroxide and the antibiotics back extracted into an organic solvent such as ethyl acetate or diethyl ether. The organic extract is then washed and dried and evaporated to dryness to provide the antibiotic mixture in a purified form.

The individual antibiotic factors can be separated from each other and isolated as individual antibiotics by chromatographic techniques known in the art. For example, the crude mixture can be separated by chromatography over aluminia or silica. Alternatively, the individual antibiotics can be obtained by fractional recrystallization.

Because of the number of antibiotic factors produced and present in the isolated mixture and also because of the close structural relationship of the factors, combinations of chromatographic methods and fractional crystallization procedures are used in the separation and isolation of the individual factors. Factor B which is produced in abundant quantities is most easily isolated. The remainder of the other described factors which occur individually as minor antibiotic factors are more difficult to separate from one another. For example, factor B can be obtained in crystalline form by first dissolving the antibiotic mixture in a minimum amount of acetone or ethyl acetate, diluting the concentrated solution with a large volume of hexane, and thereafter cooling the solution at a temperature of about $-20°$ to $-5°C$. to precipitate a large portion of factor B. The precipitate is filtered and further purified by recrystallization. The filtrate is then evaporated to dryness to obtain a residue comprising the remaining factors and some additional amount of factor B. The residue can then be chromatographed and preferably by the gradient-elution technique over basic alumina employing a gradient such as ethyl acetate-hexane-water to effect partial separation of the remaining factors. Further separation is achieved by further chromatography of the eluate fractions from the basic alumina chromatogram and by fractional crystallization to provide the individual minor factors.

In order to mroe fully illustrate the methods and procedures of the present invention the following examples are provided.

EXAMPLE 1

The production of antibiotic A-25822 mixture is illustrated by the following procedure.

Spores of *Geotrichum flavo-brunneum* strain NRRL 3862 were inoculated on a nutrient agar slant having the following composition.

| Agar Slant Medium | |
|---|---|
| Ingredient | Weight/Volume (g./l.) |
| Glucose | 20 |
| Peptone | 5 |
| Potassium dihydrogen phosphate | 0.5 |
| Magnesium sulfate | 0.02 |
| Ferrous sulfate | 0.01 |
| Agar | 20 |

The slant cultures are incubated at a temperature of 25°C. for 7 days and then stored in a refrigerator until used.

A vegetative inoculum is prepared by transferring a loop of spores from the slant culture prepared as previously described to 100 ml. of a vegetative medium contained in a 500 ml. flask. The vegetative medium has the following composition:

Vegetative Medium

| Ingredient | Weight/Volume (g./l.) |
| --- | --- |
| Sucrose | 25 |
| Edible Molasses | 36 |
| Corn steep | 6 |
| Potassium dihydrogen phosphate | 2 |
| NZ case[1] | 10 |
| Tap water | |

[1]Enzymatic digest of casein, Scheffield Chemical Co., Norwich, N.Y.

The inoculated vegetative medium is shaken on a rotary shaker at 250 rpm. for 24 to 48 hours at a temperature of about 25°C.

Following the incubation of the vegetative inoculum, 5 percent of the volume of the vegetative inoculum containing viable vegetative growth is employed to inoculate the fermentation medium for the production of the A-25822 antibiotics. The production medium employed has the following composition:

Fermentation Medium

| Ingredient | Weight/Volume (g./l.) |
| --- | --- |
| Glucose | 25 |
| Corn Starch | 10 |
| Peptone (meat) | 10 |
| NZ Amine A[1] | 4 |
| Molasses | 5 |
| Magnesium sulfate heptahydrate | 5 |
| Calcium carbonate | 2 |
| Tap water | |

[1]Pancreatic hydrolysate of casein, Scheffield Chemical Company, Norwich, N.Y.

The initial pH of the production medium was 6.2. The inoculated production medium was fermentated in a sterile fermentation tank with continual agitation at a temperature of 25°C. for 72 hours. Throughout the fermentation sterile air was passed through the fermentation medium at a rate of one half volume of air per volume of fermentation medium per minute.

From time to time during the fermentation small samples of the production medium were withdrawn and assayed for antibiotic activity against the organism *Trichophyton mentagrophytes*.

During the course of the fermentation the pH of the medium gradually increased to a final pH of pH 7.3.

The mixture of A-25822 antibiotics was recovered from the fermentation medium in the following manner. Nine hundred liters of whole fermentation broth were stirred with an equal volume of ethyl acetate; the mixture was then filtered and the filtrate was separated into the organic phase and the aqueous phase. The aqueous phase was discarded and the filtered mycelium was extracted a second time with a fresh portion of 100 l. of ethyl acetate. The mycelium was discarded and the two organic extracts were combined. The combined extracts were concentrated to an aqueous phase of about 50 liters. The aqueous solution containing the A-25822 antibiotics was diluted to a volume of 100 l. with distilled water and the pH of the solution was adjusted to pH 10 by the addition of 5 N sodium hydroxide. The basic aqueous solution was then extracted twice with equal volumes of ethyl acetate. The spent aqueous phase was discarded. The ethyl acetate extracts were then combined and concentrated to an oily antibiotic residue.

The residue was dissolved in 20 l. of diethyl ether. The solution was then washed twice with 10 l. portions of 2.5 N sodium hydroxide and then 3 times with 10 l. volumes of cold distilled water. All washes were discarded. The diethyl ether solution was then concentrated to a volume of 5 l. and the concentrate was extracted twice with 2 l. of 0.2 N sulfuric acid. The spent organic phase was then discarded. Acid extracts were combined and the pH was adjusted to 10.0 with 5.0 N sodium hydroxide. The basified extracts were extracted twice with 5 l. volumes of n-hexane and once with 5 l. of ethyl acetate. The spent aqueous phase was then discarded. The two n-hexane extracts were combined and filtered. The filtrate was dried over sodium sulfate and then concentrated in vacuo to provide 43 g. of the A-25822 mixture of antibiotics as a crude residual foam. The ethyl acetate extract was filtered and the filtrate dried over sodium sulfate. The dried filtrate was then concentrated in vacuo to provide an additional 1 g. of A-25822 antibiotics as a residual foam.

In Example 2 which follows, the separation, purification, and isolation of the individual A-25822 antibiotics from the A-25822 mixture is described. Because of the greater abundance of factor B in the A-25822 mixture, it is the most easily isolated factor of the 7 thus far identified in the A-25822 mixture.

EXAMPLE 2

The antibiotic mixture obtained as described by Example 1 was dissolved in 200 ml. of 4:1 n-hexane:acetone. The volume of the solution was adjusted to 1 liter with n-hexane and the diluted solution was cooled to a temperature of −20°C. On standing 22.0 g. of antibiotic A-25822 factor B was crystallized from the solution. The crystalline factor B was filtered and the filtrate was evaporated in vacuo to yield 20 g. of the A-25822 antibiotic mixture as a residual solid. The residue was dissolved in the upper phase of an 80:16:4 mixture of ethyl acetate:n-hexane:distilled water. This solution was passed over a column measuring 13 cm. × 63 cm. packed with basic alumina (Woelm grade W200, Water Associates Inc., Framingham, Mass.) The alumina was packed in the column in the upper phase of an 80:16:4 mixture of ethyl acetate:n-hexane:distilled water. The column was eluted with the same solvent mixture and eluate fractions of 1 liter volume each were collected. The identity of the antibiotics in the respective fractions was determined by thin layer chromatography.

The thin layer chromatograms were run on 20 cm. × 20 cm. precoated glass plates coated with silica gel F254, having a layer thickness of 0.25 mm. as supplied by Brinkmann Instruments, Inc., Westberry, N.Y. 11590. The plates were developed in 3:1 diethyl ether:ethanol. Alternatively, the identity of the individual antibiotics in the respective fractions can be determined by gas-liquid chromatography.

In Table V which follows, the results of the chromatographic run described above are presented. In the Table the antibiotics present in the combined fractions as shown, are designated as antibiotic combinations.

Table V

Chromatographic Separation of A-25822
Factors Over Basic Alumina

| Antibiotic Combination | Fractions | Antibiotic Factors |
|---|---|---|
| I | 7–8 | M and N |
| II | 9–23 | A and L |
| III | 24–42 | B and H |
| IV | 43–48 | B |
| V | 55–70 | D |

Each antibiotic combination was concentrated in vacuo to an oily residue.

Five hundred milligrams of antibiotic combination I, containing factors M and N as shown in the above Table, were dissolved in 20 ml. of acetone. The solution was cooled to a temperature of −20°C. On standing antibiotic factor A-25822 N crystallized as white prisms from the solution. The crystalline factor N was filtered and dried and had a melting point of 156°–159°C. Yield: 39 mg. On recrystallization from acetone factor N melted at about 165°C. The filtrate was evaporated in vacuo to obtain an oily residue. The residue was dissolved in chloroform and the solution was passed over a column measuring 1.0 cm. × 25 cm. packed with basic alumina. The alumina was previously deactivated with distilled water and was then washed with chloroform after deactivation. The effluent and wash obtained in the deactivation of the adsorbent were discarded. The column was then eluted with chloroform and fractions of 10 ml. volume each were collected. Fractions 18–31 were combined and evaporated in vacuo to obtain an oily residue. The residue was dissolved in benzene and the benzene solution was lyophilized to yield 334 mg. of antibiotic A-25822 factor M as an amorphous solid melting at about 140°C. with decomposition.

Six grams of the antibiotic combination II, containing factors A and L, were dissolved in 100 ml. of acetone. The solution was cooled to a temperature of 4°C. and on standing, antibiotic factor A crystallized from the solution. The crystals were filtered and recrystallized from warm acetone to yield 1.78 g. of antibiotic A-25822 A melting at about 147°C. The filtrate from the initial filtration of factor A was evaporated in vacuo to an oily residue. The residue was dissolved in chloroform and the solution was passed over a column measuring 1.7 cm. × 58 cm. packed with silica gel (Woelm Dry Column Grade, Activity III/30 mm., Alupharm Chemicals, New Orleans, La.) The silica gel was packed into the column in the dry state. The column was eluted with chloroform and the resolution of the bands corresponding to the individual antibiotics A and L was detected with 254 millimicron ultraviolet light. After the column had been eluted with a volume of chloroform corresponding to 2.3 column volumes, antibiotic factor L was collected in a volume of chloroform corresponding to one column volume. The eluate containing Factor L was evaporated in vacuo to yield 0.191 g. of antibiotic factor A-25822 L as an amorphous solid melting at about 30°C.

Eight grams of the antibiotic combination III, containing factors B and H, were dissolved in chloroform. The chloroform solution was then chromatographed over a column measuring 6.2 cm. × 12 cm. packed with deactivated basic alumina. The column was then eluted with chloroform and multiple fractions of 20 ml. volume each were collected. Factor B was found in fractions 10–40 which were combined. Antibiotic factor H was collected in fractions 81–210 which were combined. The presence of the individual antibiotics in the respective fractions was determined by thin layer chromatography and gas-liquid chromatography. The combined fractions containing factor H were concentrated in vacuo to obtain an oil. The oil was dissolved in 4 ml. of acetone and the acetone solution was applied equally to 6 separate preparative thin layer chromatography plates. The plates were, E. Merck, 20 cm. × 20 cm. pre-coated F254 glass plates having a silica gel layer thickness of 2.0 mm. (Brinkmann Instruments, Inc., Westburry, N.Y.) and were developed with 3:1 diethyl ether:ethanol. The area on each plate containing antibiotic factor H was scraped off each plate and the material combined. The silica containing factor H was air dried and applied to the top of a 6.2 cm. × 3 cm. column packed with silica gel (Grade 62, 60–200 Mexh, Matheson, Coleman, and Bell, Norwood, Ohio.) The silica gel packed in the column had previously been washed with ethyl acetate. The column was then eluted with 1 liter of ethyl acetate. The eluate was collected and concentrated in vacuo to yield 0.146 g. of antibiotic factor A-25822 H as an amorphous solid melting at about 74°–77°C. Two and a half grams of antibiotic combination V, containing antibiotic factor D, as shown by thin-layer chromatography, were dissolved in chloroform. The chloroform solution was passed over a column measuring 4.6 cm. × 56 cm. packed with silica gel. The silica gel has previously been washed on the column with chloroform. The column was eluted with chloroform to which was added a linear methanol gradient of 0–40 percent. Multiple fractions of 20 ml. volume each were collected. Antibiotic factor D was eluted in fractions 135–170 as determined by thin layer chromatography and gas-liquid chromatography. Fractions 135–170 were combined and concentrated in vacuo to yield 0.818 g. of antibiotic A-25822 factor D as an amorphous solid melting at about 51°–55°C.

We claim:

1. The method for producing the antibiotic compound of

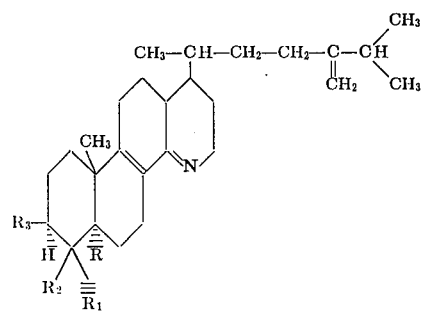

wherein $R_1$ and $R_2$ are both hydrogen or both methyl, and when $R_1$ and $R_2$ are both methyl $R_3$ is hydroxy; which comprises cultivating Geotrichum flavobrunneum NRRL 3862 in a culture medium containing assimilable sources of carbon, nitrogen and inorganic salts under submerged aerobic fermentation conditions at a temperature of 25°–35°C and at a pH between 6 and 8 until a substantial amount of antibiotic activity is produced by said organism in said culture medium and recovering the antibiotic from said culture medium.

2. The method for producing the antibiotic of

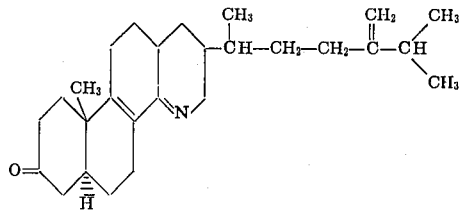

which comprises cultivating Geotrichum flavobrunneum NRRL 3862 in a culture medium containing assimilable sources of carbon, nitrogen and inorganic salts under submerged aerobic fermentation conditions at a temperature of 25°–35°C and at a pH between 6 and 8 until a substantial amount of antibiotic activity is produced by said organism in said culture medium and recovering the antibiotic compound from said medium.

* * * * *

UNITED STATES PATENT OFFICE
CERTIFICATE OF CORRECTION

Patent No. 3,887,433  Dated June 3, 1975

Inventor(s) Robert H. Williams et al.

It is certified that error appears in the above-identified patent and that said Letters Patent are hereby corrected as shown below:

Column 1, line 37, "flavobrunneum" should read -- flavobrunneum --. Table II, in the third column heading from the left, insert -- A-26 -- after "albicans". Column 8, line 3, "discplate" should read --disc plate--. Column 9, line 36, "than" should read --then--. Column 10, line 24, "after" should read --with--. Column 11, line 13, "listied" should read --listed--; line 14, "throsphores" should read --throspores--. Column 12, line 30, insert --a-- after "to". Column 13, line 21, "th" should read --the--. Column 14, line 35, "mroe" should read --more--.

On line 2 of claim 1, after "of" insert --the formula--;

In claim 2, after "of" insert -- the formula --.

Signed and Sealed this thirtieth Day of December 1975

[SEAL]

Attest:

RUTH C. MASON  
Attesting Officer

C. MARSHALL DANN  
Commissioner of Patents and Trademarks

UNITED STATES PATENT OFFICE
CERTIFICATE OF CORRECTION

Patent No. 3,887,433　　　　　　　　Dated　June 3, 1975

Inventor(s)　Robert H. Williams et al.

It is certified that error appears in the above-identified patent and that said Letters Patent are hereby corrected as shown below:

Claim 1, correct the structural formula to appear as follows:

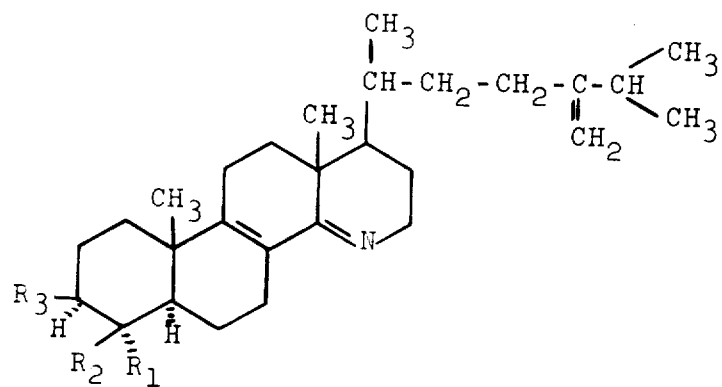

On the first line after the formula, insert after "methyl" --$R_3$ is hydroxy or acetoxy;--.

UNITED STATES PATENT OFFICE
CERTIFICATE OF CORRECTION

Patent No. 3,887,433                    Dated    June 3, 1975

Inventor(s)  Robert H. Williams et al.

It is certified that error appears in the above-identified patent and that said Letters Patent are hereby corrected as shown below:

Claim 2, correct that portion of the structural formula to appear as follows:

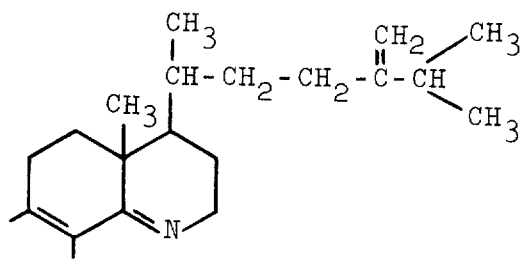

Signed and Sealed this

Twenty-first Day of November 1978

[SEAL]

Attest:

RUTH C. MASON
*Attesting Officer*

DONALD W. BANNER
*Commissioner of Patents and Trademarks*